US012697866B2

(12) United States Patent
Kumar et al.

(10) Patent No.: US 12,697,866 B2
(45) Date of Patent: Aug. 4, 2026

(54) CLOSURE DEVICE FOR A FRONT-END AIR FLOW OF A MOTOR VEHICLE, COMPRISING A SHUTTER FASTENING SYSTEM

(71) Applicant: VALEO SYSTEMES THERMIQUES, La Verriere (FR)

(72) Inventors: Vijendra Kumar, Chennai (IN); Sebastien Velasco, Chennai (IN); Vladimir Szegeny, Prague (CZ); Frederic Vacca, La Verriere (FR)

(73) Assignee: Valeo Electrification, Cergy Pontoise (FR)

( * ) Notice: Subject to any disclaimer, the term of this patent is extended or adjusted under 35 U.S.C. 154(b) by 610 days.

(21) Appl. No.: 18/248,253

(22) PCT Filed: Sep. 27, 2021

(86) PCT No.: PCT/EP2021/076548
    § 371 (c)(1),
    (2) Date: Apr. 7, 2023

(87) PCT Pub. No.: WO2022/073794
    PCT Pub. Date: Apr. 14, 2022

(65) Prior Publication Data
    US 2023/0373291 A1    Nov. 23, 2023

(30) Foreign Application Priority Data
    Oct. 7, 2020    (FR) ...................................... 2010225

(51) Int. Cl.
    *B60K 11/08*    (2006.01)

(52) U.S. Cl.
    CPC .................................. *B60K 11/085* (2013.01)

(58) Field of Classification Search
    CPC ......... B60K 11/085; B60K 11/08; F01P 11/10
    See application file for complete search history.

(56) References Cited

FOREIGN PATENT DOCUMENTS

| CN | 109109654 A * | 1/2019 | ............. B60K 13/02 |
| DE | 3605064 A1 | 8/1987 | |

(Continued)

OTHER PUBLICATIONS

Translation of CN-109109654-A relied upon in at least the first nonfinal rejection. (Year: 2019).*

(Continued)

*Primary Examiner* — James A Shriver, II
*Assistant Examiner* — Nicholas R. Kandas
(74) *Attorney, Agent, or Firm* — Valeo Electrification

(57)    ABSTRACT

A shut-off device including: a support frame with a front face and a rear face and having four sidewalls, at least one flap which is disposed within the support frame and is able to pivot about a pivot axis between a first, open, end position and a second, closed, end position, the flap being connected to the support frame by a pivot connection. The pivot connection has an open receiving recess disposed on one of the faces of the support frame and is intended to receive the pivot axis of the flap, the shut-off device further including: a retaining bar which covers an aperture of the receiving recess and is intended to retain the pivot axis of the flap within the receiving recess, and two guides which are aligned and disposed so as to retain the retaining bar above the aperture of the receiving recess.

19 Claims, 8 Drawing Sheets

(56)        References Cited

FOREIGN PATENT DOCUMENTS

| GB | 2332657 | A | 6/1999 |
| WO | 2018134493 | A1 | 7/2018 |

OTHER PUBLICATIONS

European Patent Office, International Search Report (with English translation) and Written Opinion of corresponding International Application No. PCT/EP2021/076548, dated Nov. 9, 2021.

* cited by examiner

CLOSURE DEVICE FOR A FRONT-END AIR FLOW OF A MOTOR VEHICLE, COMPRISING A SHUTTER FASTENING SYSTEM

TECHNICAL FIELD

The present invention relates to the field of devices for shutting off an air flow for a motor vehicle front end, and more precisely to a flap fixing system

BACKGROUND OF THE INVENTION

The front ends of motor vehicles generally have one or more main air intakes, through which an air flow enters, bound for the front compartment of the motor vehicle. Heat exchangers of the motor vehicle, such as for example the one that is used for air conditioning the car interior and/or the one that is used for cooling the engine, are generally placed behind these air intakes.

It is likewise known practice to dispose, in the path of air passing through the main air intakes, a support frame having one or more pivotably mounted flaps which are able to assume a multiplicity of different angular positions between an open position and a shut-off position, thus forming a shut-off device which is similar to a louver blind. This shut-off device is sometimes referred to as active grille shut-off device, or controlled air intake module. Such a shut-off device can likewise be referred to as AGS (standing for active grille shutter).

The shut-off device makes it possible to adjust the flow rate of air passing through the air intakes and arriving at the heat exchangers. It is thus possible to optimize the effectiveness of these heat exchangers, depending on requirements, by varying the amount of air that they receive. In addition, at high speed, having the flaps in the shut-off position makes it possible to reduce the drag coefficient of the motor vehicle, and thus improve the aerodynamics of said motor vehicle. The shut-off device thus makes it possible to reduce energy consumption and pollution if the engine does not need to be cooled by air from the outside.

The flaps are generally connected to the support frame by means of one or more pivot connections. The installation and securing of these pivot connections can, however, be complicated and lengthy in the course of the manufacture of the shut-off device.

In general, these pivot connections consist of an open receiving recess disposed on the support frame. A pivot axis of a flap is inserted within this receiving recess. The opening of the receiving recess is then closed again generally by a plate screwed to the support frame in order that the pivot axis cannot leave the receiving recess. The positioning and fixation of this plate, generally by screwing, can be problematic and lengthy, increasing the manufacturing time and therefore the manufacturing costs.

SUMMARY OF THE INVENTION

One of the objects of the present invention is therefore to at least partially overcome the disadvantages of the prior art and to propose a pivot connection which is reliable and can be mounted quickly during the manufacturing process for the shut-off device.

The present invention therefore relates to a device for shutting off an air intake of a motor vehicle front end, comprising:
  a support frame having four sidewalls, at least one flap which is disposed within the support frame and is able to pivot about a pivot axis between a first, open, end position and a second, closed, end position, said at least one flap being connected to the support frame by at least one pivot connection,
said at least one pivot connection having an open receiving recess disposed on one of the faces of the support frame and intended to receive the pivot axis of the at least one flap, the shut-off device furthermore having:
  a retaining bar which covers the aperture of the receiving recess and is intended to retain the pivot axis of the at least one flap within said receiving recess, and
  at least two guides which are aligned and disposed so as to retain the retaining bar above the aperture of the receiving recess.

According to one aspect of the invention, the retaining bar is inserted in the at least two guides by sliding it from one of the sidewalls of the support frame.

According to another aspect of the invention, the insertion sidewall for inserting the retaining bar has an insertion opening.

According to another aspect of the invention, the sidewall opposite the insertion sidewall for inserting the retaining bar has a stop wall against which a first end of the retaining bar is intended to rest.

According to another aspect of the invention, the sidewall opposite the insertion sidewall for inserting the retaining bar has a recess within which the first end of the retaining bar is intended to be inserted, the bottom of said recess forming the stop wall.

According to another aspect of the invention, a second end of the retaining bar has an elastic tab having a free end, said free end being intended to bear against the internal face of the insertion sidewall and to oppose the removal of said retaining bar through the insertion opening.

According to another aspect of the invention, the frame has two lateral uprights and two end crossmembers connecting the two lateral uprights, the flaps extending parallel to the end crossmembers.

According to another aspect of the invention, at least one of the lateral uprights has at least one open receiving recess for a pivot connection with a flap and has at least two aligned guides disposed so as to keep the retaining bar above the receiving opening.

According to another aspect of the invention, the frame has at least one intermediate upright which is parallel to the lateral uprights and connects the two end crossmembers, said intermediate upright having at least one open receiving recess for a pivot connection with a flap and having at least two aligned guides disposed so as to keep the retaining bar above the receiving opening.

According to another aspect of the invention, the at least two guides form an arch inside which the retaining bar is intended to be inserted.

According to another aspect of the invention, a first end of the retaining bar, which end is intended to be the first one that is slid in, has a smaller width than a second end of said retaining bar, opposite to the first end.

According to another aspect of the invention, the guides have a height defined such that the retaining bar presses and retains the pivot axis against the bottom of the receiving recess.

According to another aspect of the invention, the guides are made in one piece with the frame.

According to another aspect of the invention, the retaining bar is made of plastics material.

According to another aspect of the invention, the second end of the retaining bar has a retaining flange.

According to another aspect of the invention, the insertion opening has at least one stop against which the retaining flange is intended to rest.

BRIEF DESCRIPTION OF DRAWINGS

Further features and advantages of the present invention will become more clearly apparent from reading the following description, which is given by way of non-limiting illustration, and with reference to the accompanying drawings, in which.

DETAILED DESCRIPTION OF THE INVENTION

In these figures, identical elements bear the same reference numbers.

The following embodiments are examples. Although the description refers to one or more embodiments, this does not necessarily mean that each reference relates to the same embodiment, or that the features apply only to a single embodiment. Individual features of different embodiments can also be combined and/or interchanged to provide other embodiments.

In the present description, certain elements or parameters can be indexed, such as, for example, first element or second element and also first parameter and second parameter or else first criterion and second criterion, etc. In this case, it is a matter of simple indexing to differentiate and designate elements or parameters or criteria that are similar but not identical. This indexing does not imply priority being given to one element, parameter or criterion over another and such designation can be interchanged easily without departing from the scope of the present description. Neither does this indexing imply a chronological order, for example in evaluating any given criterion.

In the following description, the terms "upper" and "lower" refer to the disposition of elements on the device for shutting off the front end air intake in the mounted state of the shut-off device on the motor vehicle.

Figure 1:
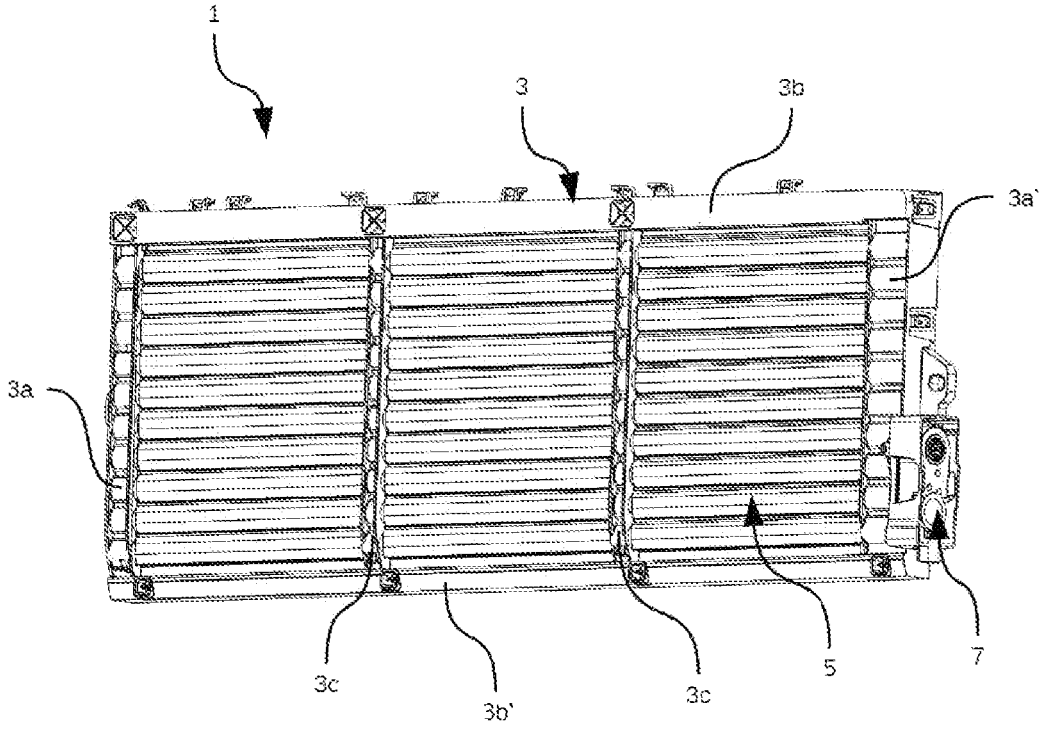
FIG. 1 shows a schematic depiction, in perspective, of the front face of a shut-off device.
Figure 2:
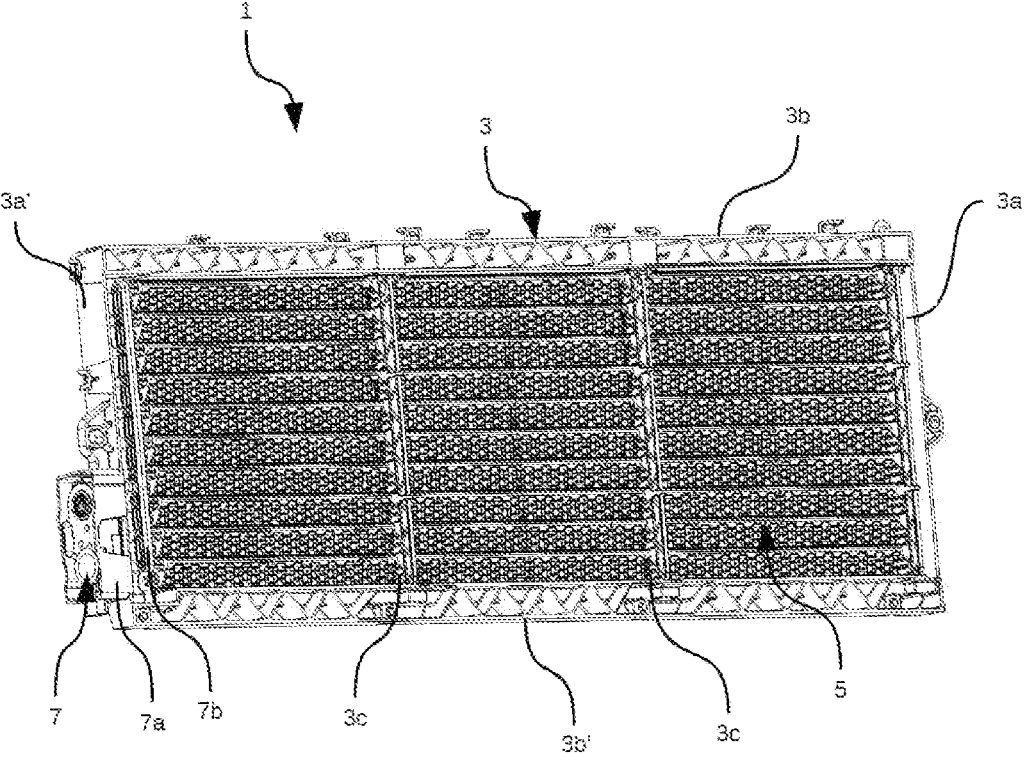
FIG. 2 shows a schematic depiction, in perspective, of the rear face of a shut-off device.

FIGS. 1 and 2 show the front face and rear face, respectively, of a shut-off device 1 for the air intake for a motor vehicle front end. In this case, front face is understood to mean the face of the shut-off device 1 that is intended to face the front of the motor vehicle. In this case, rear face is understood to mean the face of the shut-off device 1 that is opposite to the front face and is intended to face the rear of the motor vehicle.

The shut-off device 1 comprises a support frame 3 having four sidewalls 3a, 3a', 3b, 3b'. These sidewalls 3a, 3a', 3b, 3b' can notably have two lateral uprights 3a, 3a' and two end crossmembers 3b, 3b' connecting the two lateral uprights 3a, 3a' to one another, thus defining an aperture of the support frame 3. The support frame 3 then has a rectangular overall shape. More particularly, the support frame 3 has an upper end crossmember 3b and a lower end crossmember 3b', these orientations arbitrarily corresponding to the disposition of the shut-off device 1 when mounted in the motor vehicle. The upper end crossmember 3b will then be disposed facing the top of the motor vehicle and the lower end crossmember 3b', for its part, will be disposed facing the bottom of the motor vehicle.

The support frame 3 can also have at least one intermediate upright 3c which is parallel to the lateral uprights 3a, 3a' and connects the end crossmembers 3b, 3b'. This intermediate upright 3c more particularly connects the upper end crossmember 3b to the lower end crossmember 3b' within the aperture of the support frame 3. In the example presented in FIGS. 1 and 2, the aperture of the support frame 3 is divided into three by two intermediate uprights 3c.

The support frame 3 has at least one flap 5 disposed on the inside of the aperture. The flap(s) 5 are mounted so as to be able to pivot about a pivot axis P (visible in FIGS. 4 and 5) between a first, open, end position (which is not shown and a second, closed, end position (visible in FIGS. 1 and 2). When the flap(s) 5 are in their first, open, end position, the flow of air can pass through the aperture of the support frame 3. When the flap(s) 5 are in their second, closed, end position, the flap(s) 5 shut off the aperture of the support frame 3 and oppose the passage of the flow of air.

Still in the example illustrated in FIGS. 1 and 2, the support frame 3 has a plurality of flaps 5 forming at least one set of flaps 5 which are disposed parallel to one another in one and the same plane and are adjacent. In the present case, the support frame 3 has a single set of flaps 5 disposed in the aperture of the support frame 3. The flaps 5 are notably disposed horizontally and one above another, parallel to the end crossmembers 3b, 3b'. The flaps 5 then form a pivot connection with the lateral uprights 3a, 3a'. In this case, the intermediate uprights 3c act as support in order to keep the flaps 5 straight and stop them from bending under their own weight. The flaps 5 thus likewise form a pivot connection with these lateral uprights 3c.

Moreover, the support frame 3 has at least one drive device 7 (visible in FIGS. 1 and 2) configured to control the positioning, and hence the pivoting, of the flap(s) 5 between their first, open, end position and their second, closed, end position.

The drive device 7 notably has an actuator 7a, for example an electric motor, and a control member 7b (which are visible in FIG. 2). In the example illustrated in FIGS. 1 and 2, the actuator 7a is connected directly to a control member 7b, for example a link rod, by a lever (not visible), the control member 7b for its part also being connected to each flap 5. Rotating the actuator 7a then makes the control member 7b move in translation in order to simultaneously pivot the flap(s) 5. Further methods for transmitting the rotational movements of the actuator 7a to the set of flaps 5 are entirely conceivable.

Still in the example illustrated in FIGS. 1 and 2, the drive device 7 is disposed on one of the lateral uprights 3*a*, 3*a*' of the support frame 3 in order to be able to pivot the flap(s) 5 at the same time.

Figure 3:
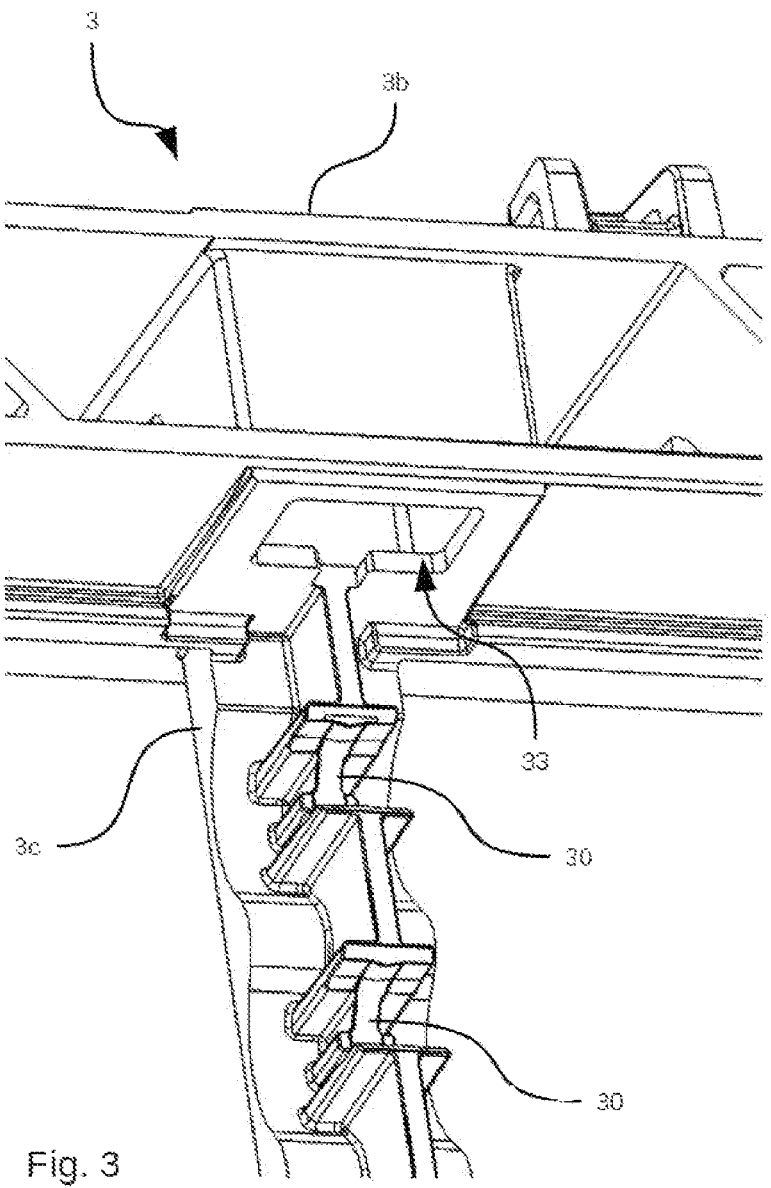
FIG. 3 shows a schematic depiction, in perspective, of an upper portion of support frame and an intermediate upright.
Figure 4:
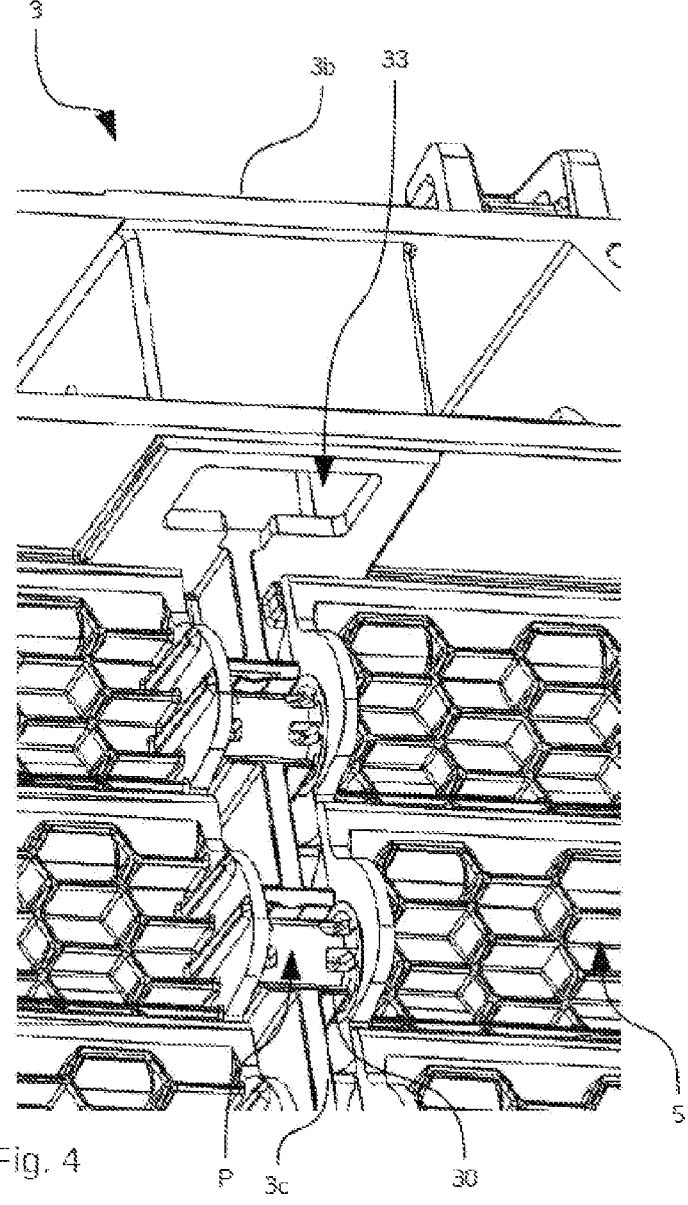
FIG. 4 shows a schematic depiction, in perspective, of the upper portion of support frame and intermediate upright of FIG. 3 with flaps.
Figure 5:
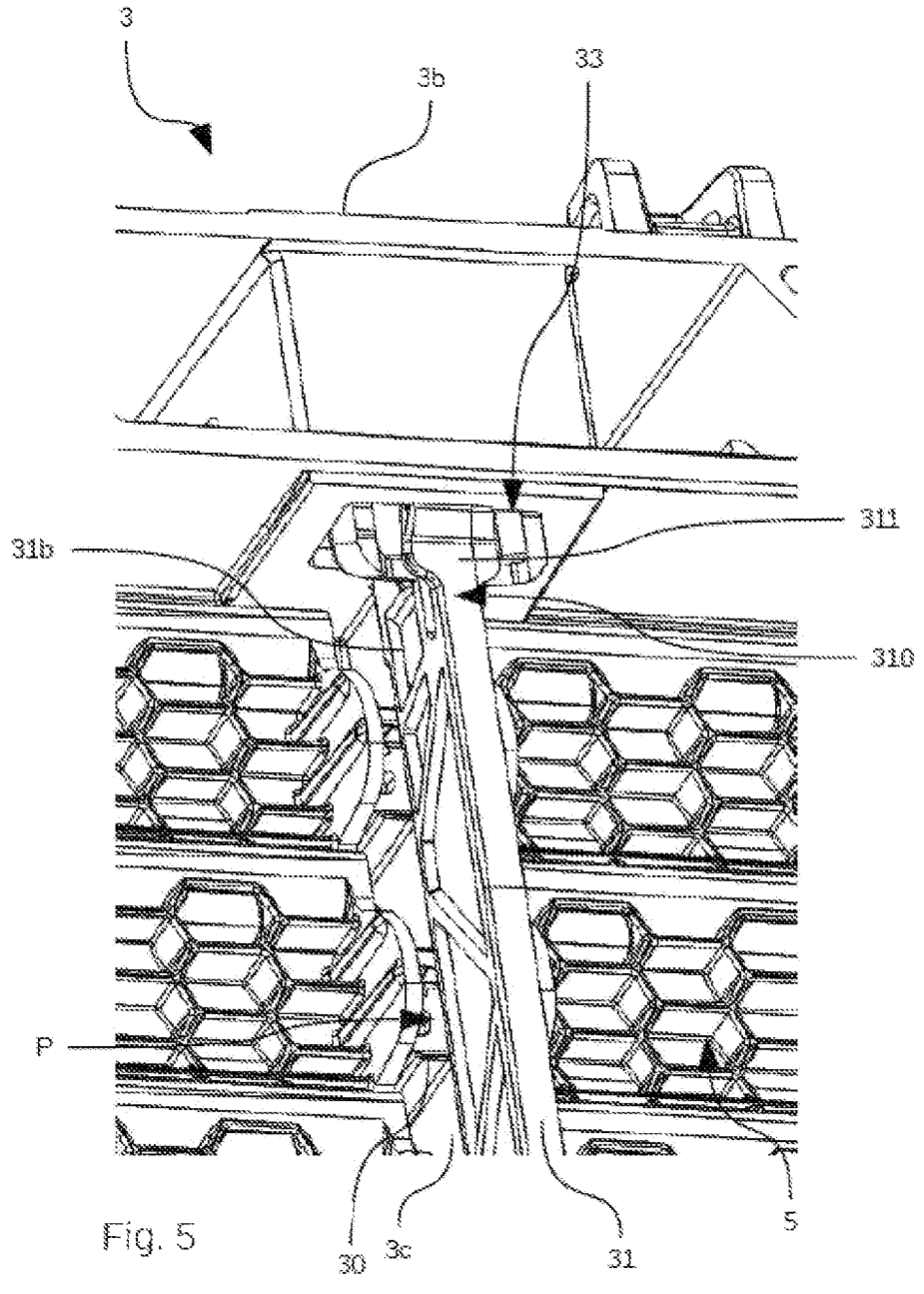
FIG. 5 shows a schematic depiction, in perspective, of the upper portion of support frame and intermediate upright with flaps of FIG. 4 with a retaining bar.

FIGS. 3 to 5 show the pivot connection between the flap(s) 5 and the support frame 3 in greater detail. In the example illustrated, this involves pivot connections between the flaps 5 and an intermediate upright 3*c*. However, as mentioned above, this pivot connection can also be with one of the sidewalls 3*a*, 3*a*', 3*b*, 3*b*' of the support frame 3, depending on the configuration and the positioning of the flap(s) 5.

The at least one pivot connection thus has an open insertion recess 30 disposed on one of the faces of the support frame 3 and intended to receive the pivot axis P of the flap(s) 5. As shown in FIGS. 3 and 4, in this case this receiving recess 30 is disposed on an intermediate upright 3*c* when the flap(s) 5 are disposed parallel to the end crossmembers 3*b*, 3*b*'. Such a receiving recess 30 can, however, also be present on one or the two lateral uprights 3*a*, 3*a*' so as to ensure the pivot connection with the flap(s) 5.

The receiving recess 30 is preferably disposed on the rear face of the support frame 3 such that its aperture faces the rear of the motor vehicle in the mounted state. This makes it possible to protect this pivot connection from any debris or dust that could become lodged within the receiving recess and jam the pivot connection, thus potentially preventing the rotation of the flap(s) 5.

Figure 6:
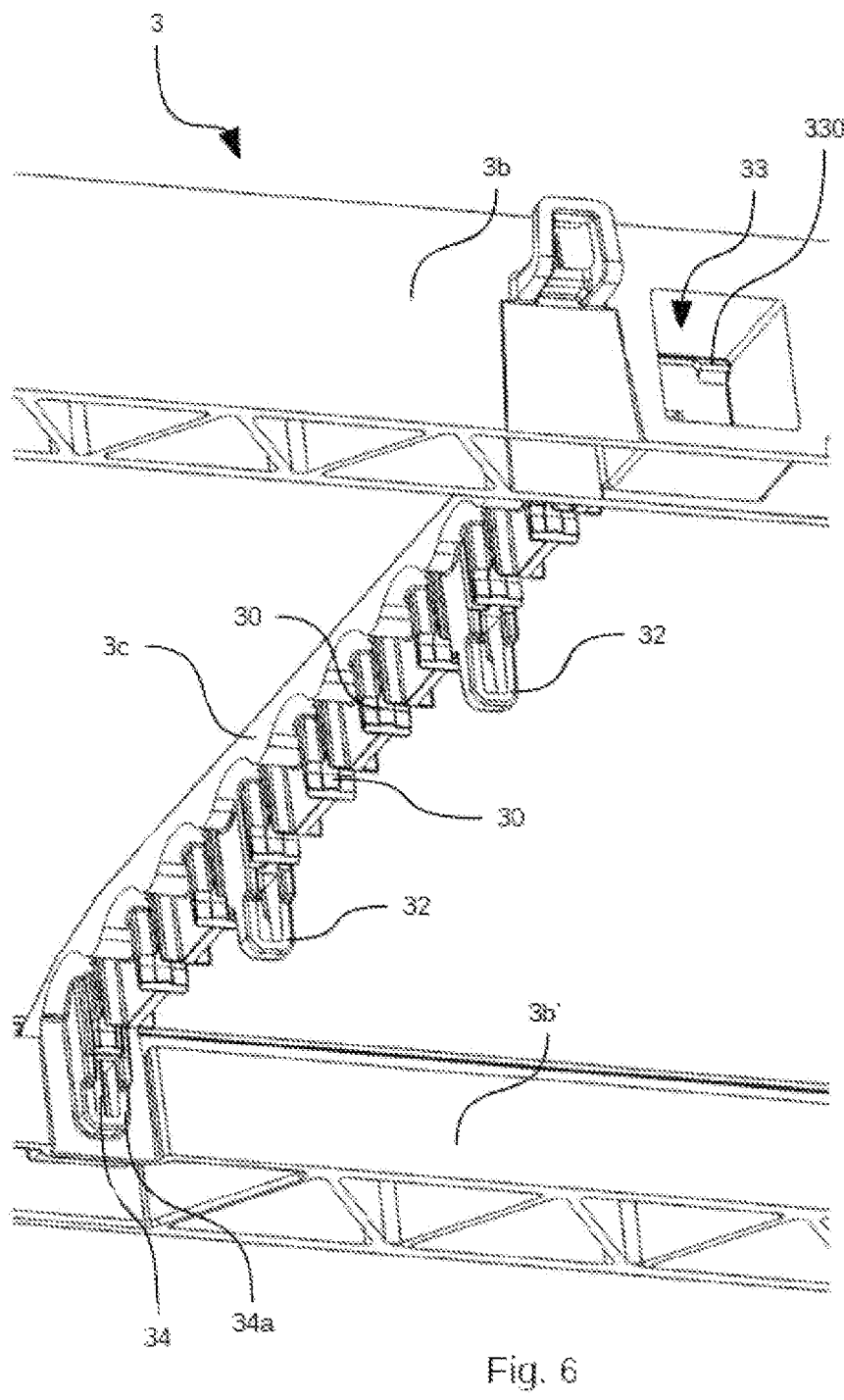
FIG. 6 shows a schematic depiction, in perspective, of a portion of support frame and an intermediate upright with guides.
Figure 7:
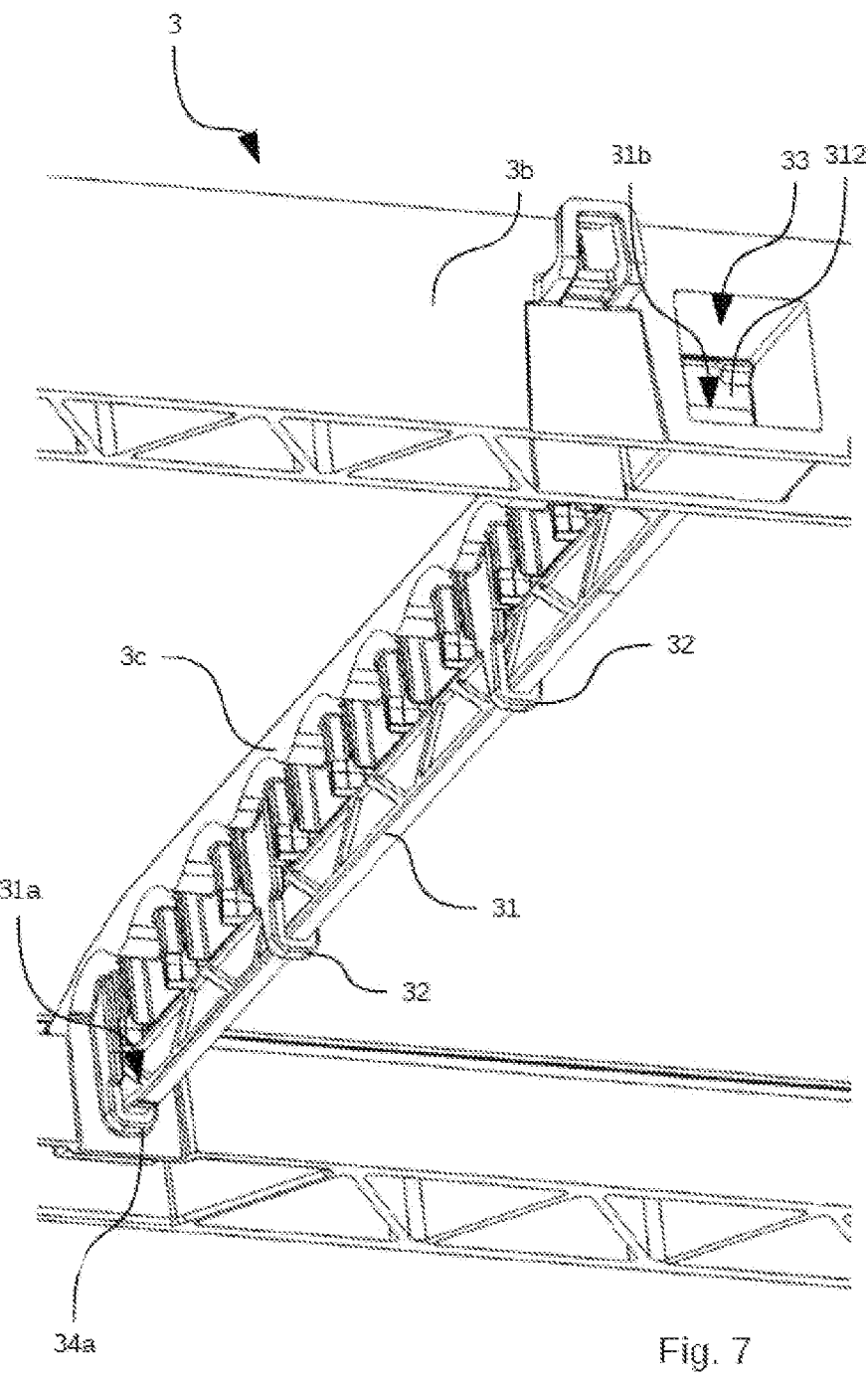
FIG. 7 shows a schematic depiction, in perspective, of the portion of support frame and the intermediate upright with guides of FIG. 6 with a retaining bar.

In order to retain the pivot axis P of the flap 5 within the receiving recess 30, the shut-off device 1 moreover has a retaining bar 31 covering the aperture of the receiving recess 30, as illustrated in FIG. 5. This retaining bar 31 is retained above the aperture of the receiving recess 30 by at least two guides 32 in which said retaining bar 31 is inserted, as illustrated in FIGS. 6 and 7. These guides 32 retain the retaining bar 31 above the aperture of the receiving recess 30 such that the sole degree of freedom of said retaining bar 31 is a sliding movement along the axis defined by the alignment of the guides 32. These guides 32 can more particularly form an arch, on the inside of which the retaining bar 31 is to be inserted. The alignment of the guides 32 preferably follows the alignment of the receiving recesses 30 and is therefore parallel to the sidewall 3*a*, 3*a*', 3*b*, 3*b*' and/or intermediate upright 3*c* in which the receiving recesses 30 are disposed. In the same way as for the receiving recess(es) 30, the guides 32 are preferably realized on the rear face of the support frame 3.

The guides 32 preferably have a height defined such that the retaining bar 31 presses and retains the pivot axis P against the bottom of the receiving recess 30. Height of the guide 32 is understood in this case more particularly to mean the length of the aperture through which the retaining bar 31 passes between a receiving recess 30 and the protruding end of the guide 32.

Using the guides 32 and a retaining bar 31 makes it possible for the pivot connection to be easily formed during the manufacture of the shut-off device. This is because an operator, after placing the pivot axes P in the receiving recesses 30, only needs a single operation of inserting the retaining bar 31 into the guides 32 to form the pivot connection. In addition, this type of fixing of the flaps 5 is particularly useful and advantageous for large shut-off devices 1, for example for vehicles such as trucks.

In the example illustrated, the guides 32 are disposed on an intermediate upright 3*c*, however, as described above, the pivot connection can also be present on one or more lateral uprights 3*a*, 3*a*'. The same therefore applies to the guides 32, which can also be disposed on at least one of the lateral uprights 3*a*, 3*a*' when the flap(s) 5 are disposed parallel to the end crossmembers 3*b*, 3*b*'.

In order to facilitate the manufacturing of the support frame 3 and of the guides 32, the latter can more particularly be made in one piece with said support frame 3. The support frame 3 and the guides 32 can thus, for example, be made of plastics material or composite material and made at the same time during a molding or overmolding step.

The retaining bar 31 can more particularly be inserted in the guides 32 by sliding them from one of the sidewalls 3*a*, 3*a*', 3*b*, 3*b*' of the support frame 3. Reference is thus made to an insertion sidewall 3*a*, 3*a*', 3*b*, In the example illustrated, this insertion sidewall 3*a*, 3*a*', 3*b*, 3*b*' is the upper end crossmember 3*b*. To let the retaining bar 31 pass, the insertion sidewall 3*a*, 3*a*', 3*b*, 3*b*' can notably have an insertion aperture 33, visible in FIGS. 3 to 7.

In order to prevent the sliding movement of the retaining bar 31, the sidewall 3*a*, 3*a*', 3*b*, 3*b*' opposite the insertion sidewall 3*a*, 3*a*', 3*b*, 3*b*', in this case the lower end crossmember 3*b*', can notably have a stop wall 34 against which a first end 31*a* of the retaining bar 31 is intended to rest, as illustrated in FIGS. 6 and 7. More specifically, the sidewall 3*a*, 3*a*', 3*b*, 3*b*' opposite the insertion sidewall 3*a*, 3*a*', 3*b*, 3*b*' of the retaining bar 31 can have a recess 34*a* within which the first end 31*a* of the retaining bar 31 is to be inserted. The bottom of the recess 34*a* then forms the stop wall 34. The presence of such a recess 34*a* makes it possible to lock and retain in place the first end 31*a* of the retaining bar 31.

In order to avoid the retaining bar 31 being able to come out through the insertion aperture 33, a second end 31*b* of the retaining bar 31, opposite the first end that is intended to rest against the stop wall 34, can have an elastic tongue 310 with a free end 311, as illustrated in FIG. 5. This free end 311 is notably intended to bear against the inner face of the insertion sidewall 3*a*, 3*a*', 3*b*, 3W, in this case the upper end crossmember 3*b*. Inner is understood in this case to mean that face of the insertion sidewall 3*a*, 3*a*', 3*b*, 3*b*' that faces the inside of the support frame 3. This positioning means that the elastic tongue 310 opposes the removal of the retaining bar 31 through the insertion aperture 33.

Figure 8:
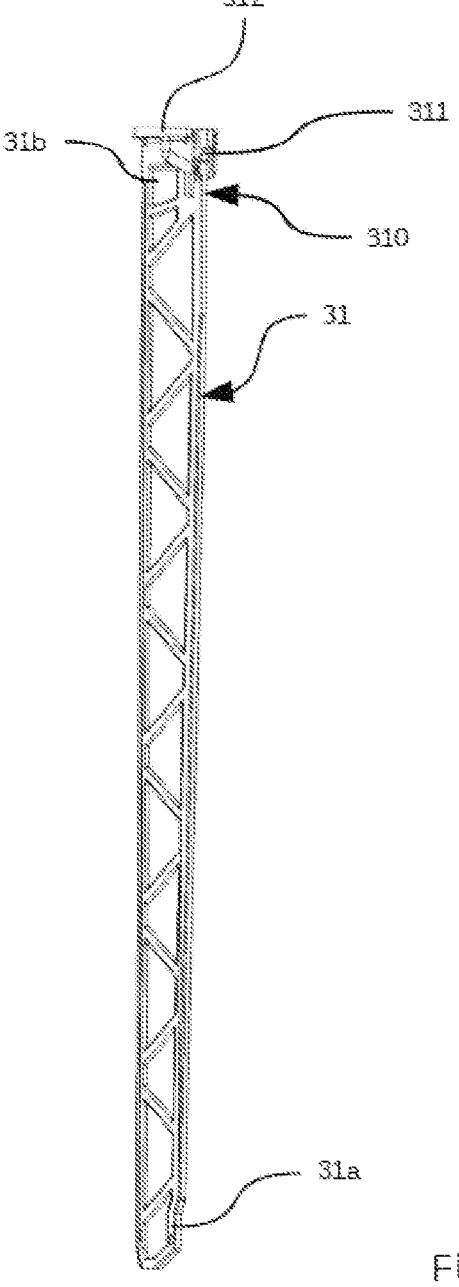
FIG. 8 shows a schematic depiction, in perspective, of a retaining bar.

The second end 31*b* of the retaining bar 31 can also have a retaining flange 312, visible in FIGS. 7 and 8. This retaining flange 312 can notably have a complementary shape to the insertion aperture 33 in order to retain this second end. The insertion aperture 33, for its part, can have at least one stop 330 (visible in FIG. 6) against which the retaining flange 312 is intended to rest.

By way of this simple fixing system, the retaining bar 31 is automatically fixed after it has been placed without it being necessary for an operator to perform a dedicated fixing step.

FIG. 8 shows a retaining bar 31 in more detail and as a whole. This retaining bar 31 can notably be made of plastics material, for example by molding. The retaining bar 31 can notably have its first end 31*a* intended to be slid first, having a width less than its second end 31*b*, which is opposite the first end 31*a*. Width of the retaining bar 31 is understood in this case to mean the distance between that portion of the retaining bar that is intended to face the receiving recesses 30 and its opposite portion. As a result, the height of the guides 32 is matched to this particular shape such that the retaining bar 31 presses and retains the pivot axis (P) against the bottom of the receiving recess 30. Thus, in the example illustrated in FIGS. 6 and 7, a "lower" guide 32, that is to say one which is close to the lower end crossmember 3*b*', will have a height less than the height of an "upper" guide 32, that is to say one which is close to the upper end crossmember 3b.

Thus, it will be clearly seen that, on account of the pivot connection having the retaining bar 31 and on account of the mode for positioning the retaining bar 31 by sliding it and for automatically fixing the latter, the mounting of the shut-off device 1 is simplified and quick.

What is claimed is:

1. A shut-off device for an air intake for a motor vehicle front end, comprising:
   a support frame with a front face and a rear face and having four sidewalls,
   at least one flap which is disposed within the support frame and is able to pivot about a pivot axis between a first, open, end position and a second, closed, end position, said at least one flap being connected to the support frame by at least one pivot connection,
   wherein the at least one pivot connection has an open receiving recess disposed on one of the faces of the support frame and is intended to receive the pivot axis of the at least one flap,
   a retaining bar which covers an aperture of the receiving recess and is intended to retain the pivot axis of the at least one flap within said receiving recess, and
   wherein the retaining bar is inserted longitudinally within at least two guides which are aligned and disposed so as to retain the retaining bar above the aperture of the receiving recess.

2. The shut-off device as claimed in claim 1, wherein the retaining bar is inserted in the at least two guides by sliding the retaining bar from one of the sidewalls of the support frame, referenced as an insertion sidewall.

3. The shut-off device as claimed in claim 2, wherein the insertion sidewall for inserting the retraining bar has an insertion opening.

4. The shut-off device as claimed in claim 2, wherein the sidewall opposite the insertion sidewall for inserting the retaining bar has a stop wall against which a first end of the retaining bar is intended to rest.

5. The shut-off device as claimed in claim 4, wherein the sidewall opposite the insertion sidewall for inserting the retaining bar has a recess within which the first end of the retaining bar is intended to be inserted, the bottom of said recess forming the stop wall.

6. The shut-off device as claimed in claim 5, wherein a second end of the retaining bar has an elastic tab having a free end, said free end being inserted to bear against an internal face of the insertion sidewall and to oppose the removal of said retaining bar through the insertion opening.

7. The shut-off device as claimed in claim 1, wherein the frame has two lateral uprights and two end crossmembers connecting the two lateral uprights, the at least one flap extending parallel to the end crossmembers.

8. The shut-off device as claimed in claim 7, wherein at least one of the lateral uprights has at least one complementary open receiving recess for a pivot connection with the at least one flap and has at least two aligned guides disposed so as to keep the retaining bar above the at least one open recess.

9. The shut-off device as claimed in claim 7, wherein the frame has at least one intermediate upright which is parallel to the lateral uprights and connects the two end crossmembers, said at least one intermediate upright having at least one open recess for a pivot connection with the at least one flap and having at least two aligned guides disposed so as to keep the retaining bar above the at least one open receiving recess.

10. The shut-off device as claimed in claim 2, wherein a first end of the retaining bar, is intended to be the first one that is slid in, and has a smaller width than a second end of said retaining bar, opposite to the first end.

11. The shut-off device as claimed in claim 1, wherein the at least two guides each form an arch for insertion of the retaining bar.

12. The shut-off device as claimed in claim 1, wherein the at least two guides each surround a portion of the retaining bar.

13. A shut-off device for an air intake for a motor vehicle front end, comprising:
   a support frame with a front face and a rear face and having four sidewalls,
   at least one flap which is disposed within the support frame and is able to pivot about a pivot axis between a first, open, end position and a second, closed, end position, said at least one flap being connected to the support frame by at least one pivot connection,
   wherein the at least one pivot connection has an open receiving recess disposed on one of the faces of the support frame and is intended to receive the pivot axis of the at least one flap,
   a retaining bar which covers an aperture of the receiving recess and is intended to retain the pivot axis of the at least one flap within said receiving recess, and wherein the retaining bar is inserted within at least two guides in a longitudinal direction of the retaining bar, the at least two guides aligned and disposed so as to retain the retaining bar above the aperture of the receiving recess.

14. The shut-off device as claimed in claim 13, wherein the retaining bar is inserted in the at least two guides by sliding the retaining bar from one of the sidewalls of the support frame, referenced as an insertion sidewall.

15. The shut-off device as claimed in claim 14, wherein the insertion sidewall for inserting the retaining bar has an insertion opening.

16. The shut-off device as claimed in claim 13, wherein the at least two guides each surround a portion of the retaining bar.

17. A shut-off device for an air intake for a motor vehicle front end, comprising:
   a support frame with a front face and a rear face and having four sidewalls,
   at least one flap which is disposed within the support frame and is able to pivot about a pivot axis between a first, open, end position and a second, closed, end position, said at least one flap being connected to the support frame by at least one pivot connection,
   wherein the at least one pivot connection has an open receiving recess disposed on one of the faces of the support frame and is intended to receive the pivot axis of the at least one flap,
   a retaining bar which covers an aperture of the receiving recess and is intended to retain the pivot axis of the at least one flap within said receiving recess, and
   wherein the retaining bar is inserted within at least two guides which are aligned and disposed so as to retain the retaining bar above the aperture of the receiving recess; and wherein the retaining bar is inserted in the at least two guides by sliding the retaining bar from one of the sidewalls of the support frame, referenced as an insertion sidewall.

18. The shut-off device as claimed in claim 17, wherein the retaining bar is inserted into the at least two guides in a longitudinal direction of the retaining bar.

19. The shut-off device as claimed in claim 18, wherein the at least two guides each surround a portion of the retaining bar.

\*   \*   \*   \*   \*